US012565507B2

(12) United States Patent
Thuilliez et al.

(10) Patent No.: US 12,565,507 B2
(45) **Date of Patent: *Mar. 3, 2026**

(54) DIORGANOMAGNESIUM COMPOUND

(71) Applicant: COMPAGNIE GENERALE DES ETABLISSEMENTS MICHELIN, Clermont-Ferrand (FR)

(72) Inventors: Julien Thuilliez, Clermont-Ferrand (FR); Robert Ngo, Clermont-Ferrand (FR); François Jean-Baptiste-Dit-Dominique, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 854 days.

This patent is subject to a terminal disclaimer.

(21) Appl. No.: 17/785,952

(22) PCT Filed: Dec. 14, 2020

(86) PCT No.: PCT/FR2020/052428
§ 371 (c)(1),
(2) Date: Jun. 16, 2022

(87) PCT Pub. No.: WO2021/123591
PCT Pub. Date: Jun. 24, 2021

(65) Prior Publication Data

US 2023/0047483 A1 Feb. 16, 2023

(30) Foreign Application Priority Data

Dec. 17, 2019 (FR) ....................................... 1914627

(51) Int. Cl.
*C07F 3/02* (2006.01)
*C08F 210/02* (2006.01)

(52) U.S. Cl.
CPC .............. *C07F 3/02* (2013.01); *C08F 210/02* (2013.01)

(58) Field of Classification Search
CPC ...... C07F 3/02; B01J 2523/22; B01J 2531/22; B01J 21/10
See application file for complete search history.

(56) References Cited

U.S. PATENT DOCUMENTS 4,124,751 A 11/1978 Fischer et al.
4,870,039 A * 9/1989 Job ......................... C08F 10/00 502/134
4,870,040 A * 9/1989 Job ......................... C08F 10/00 502/134
6,372,681 B1 * 4/2002 Yamada .................. C08F 10/00 502/103
2014/0378630 A1 12/2014 McCauley et al.
2018/0362679 A1 12/2018 Kim et al.
2019/0263954 A1 * 8/2019 Lafaquiere ............ C08F 236/06
2023/0357462 A1 * 11/2023 Thuilliez ................. C07F 17/00
2024/0117080 A1 * 4/2024 Ngo ........................ C08F 10/02

FOREIGN PATENT DOCUMENTS

EP 1092731 A1 4/2001
EP 2797969 A1 11/2014
EP 3387067 A1 10/2018
WO 2004035639 A1 4/2004
WO WO-2007054224 A2 * 5/2007 .............. C07F 17/00
WO WO-2007128601 A2 * 11/2007 ............. C07B 37/04
WO WO-2013101861 A1 * 7/2013 ............ C08F 136/06
WO 2018224776 A1 12/2018

OTHER PUBLICATIONS

E. Ashby et al., 43 Journal of Organic Chemistry, 4094-4098 (1978) (Year: 1978).*
Reetz et al., 31 Angew. Chem., Int. Ed. Engl., 342-344 (1992) (Year: 1992).*
CAS Abstract and Indexed Compound, P. Knochel et al., WO 2007/128601 (2007) (Year: 2007).*
Email Communication from CAS Customer Center Regarding RN 956897-71-5 (Apr. 2, 2025) (Year: 2025).*
International Search Report and Written Opinion with English translation mailed Apr. 20, 2021 for International Application No. PCT/FR2020/052428, 11 pages.

* cited by examiner

*Primary Examiner* — Alexander R Pagano
(74) *Attorney, Agent, or Firm* — Dickinson Wright PLLC

(57) ABSTRACT

A diorganomagnesium compound of formula $R^B$—Mg—$R^A$ is provided. $R^B$ is different from $R^A$, $R^B$ comprises a benzene nucleus substituted with a magnesium atom, one of the carbon atoms of the benzene nucleus ortho to the magnesium is substituted with a methyl, an ethyl, an isopropyl or forming a ring with the carbon atom which is its closest neighbour and which is meta to the magnesium. The other carbon atom of the benzene nucleus ortho to the magnesium is substituted with a methyl, an ethyl or an isopropyl. $R^A$ is an alkyl, a cycloalkyl or a benzyl, which may be substituted or unsubstituted, which diorganomagnesium compound is other than n-butylmesitylmagnesium. When used as co-catalyst of a metallocene, it makes it possible to increase the functional group content in the synthesis of a functional polymer.

20 Claims, No Drawings

DIORGANOMAGNESIUM COMPOUND

CROSS-REFERENCE TO RELATED APPLICATIONS

This U.S. national phase patent application claims priority to and the benefit of International Patent Application No. PCT/FR2020/052428, filed on Dec. 14, 2020, which claims priority to and the benefit of French patent application no. FR1914627, filed Dec. 17, 2019, the contents of which are incorporated herein by reference in their entirety.

BACKGROUND

1. Technical Field

The field of the present invention is that of organomagnesium compounds intended to be used as co-catalysts in catalytic systems based on rare-earth metal metallocenes used in the preparation of polyolefins, in particular of copolymers of olefin and of conjugated diene.

2. Related Art

Catalytic systems based on rare-earth metal metallocenes are described, for example, in patent applications EP 1 092 731, WO 2004/035639, WO 2007/054224 and WO 2018/224776. They allow the synthesis of polyolefins, in particular of copolymers of olefin and of 1,3-diene. They are also used in the preparation of functional copolymers of ethylene and of 1,3-butadiene, as described in WO 2018/224776. In these catalytic systems, the metallocene is activated with a co-catalyst which forms part of the catalytic system. Co-catalysts that may be suitable for use include an organomagnesium agent, an organoaluminium agent or an organolithium agent. When the co-catalyst is an organomagnesium agent, it is typically a chloride of an organomagnesium agent or a diorganomagnesium compound in which the magnesium atom is bonded to two aliphatic groups, such as dibutylmagnesium, butylethylmagnesium and butyloctylmagnesium.

SUMMARY

The Applicant has discovered a novel asymmetric diorganomagnesium compound which contains a magnesium-carbon bond, said carbon being a constituent carbon atom of a specific benzene nucleus. The novel asymmetric diorganomagnesium compound used as co-catalyst of a catalytic system based on a rare-earth metal metallocene makes it possible to increase the functional group content in the synthesis of a functional polymer prepared in the presence of catalytic systems based on rare-earth metal metallocenes. Even according to certain embodiments of the invention, the catalytic activity of the catalytic system is improved.

Thus, a first subject of the invention is an asymmetric diorganomagnesium compound of formula $R^B$—Mg—$R^A$ $R^B$ being different from $R^A$, $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being an alkyl, a cycloalkyl or a benzyl, which may be substituted or unsubstituted, which diorganomagnesium compound is other than n-butylmesitylmagnesium.

The invention also relates to a process for preparing an asymmetric diorganomagnesium compound of formula $R^B$—Mg—$R^A$, which comprises the placing in contact of an organometallic compound of formula $R^AM$ with an organomagnesium agent of formula $R^B$—Mg—X and the reaction of the organometallic compound of formula $R^AM$ and of the organomagnesium agent of formula $R^B$—Mg—X, M representing a lithium, sodium or potassium atom, X representing a leaving group, $R^B$ being different from $R^A$, $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl, $R^A$ being an alkyl, a cycloalkyl or a benzyl, which may be substituted or unsubstituted, which diorganomagnesium compound is other than n-butylmesitylmagnesium.

DETAILED DESCRIPTION OF EXAMPLE EMBODIMENTS

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b).

The abbreviation "phr" means parts by weight per hundred parts of elastomer (of the total of the elastomers if several elastomers are present).

The compounds mentioned in the description may be of fossil origin or may be biobased. In the latter case, they may be partially or totally derived from biomass or may be obtained from renewable starting materials derived from biomass.

The term "based on" used to define the constituents of the catalytic system means the mixture of these constituents, or the product of the reaction of a portion or all of these constituents with each other.

The compound in accordance with the invention of formula (I) has the essential characteristic of being a diorganomagnesium compound, which is said to be "asymmetric" and is referred to in the present invention as an asymmetric diorganomagnesium compound, since the two groups represented by the symbols $R^B$ and $R^A$ are different from each other.

$$R^B\text{—Mg-}R^A \quad \text{(I).}$$

The group represented by the symbol $R^A$ is an alkyl, a cycloalkyl or a benzyl, which may be substituted or unsubstituted. The alkyl represented by the symbol $R^A$ may be linear or branched, preferably linear, and may contain from 1 to 12 carbon atoms, preferably 2 to 10 carbon atoms, more preferentially from 2 to 8 carbon atoms. The cycloalkyl represented by the symbol $R^A$ may contain 4 to 12 carbon atoms. Preferably, $R^A$ represents a linear alkyl containing from 2 to 8 carbon atoms. Better still, $R^A$ represents n-butyl.

The group represented by the symbol $R^B$ has the essential characteristic of comprising a benzene nucleus substituted with a magnesium atom. The two carbon atoms of the benzene nucleus of $R^B$ ortho to the magnesium bear an identical or different substituent.

Alternatively, one of the two carbon atoms of the benzene nucleus of $R^B$ ortho to the magnesium may bear a substituent, and the other carbon atom of the benzene nucleus of $R^B$ ortho to the magnesium may form a ring. The substituent is a methyl, an ethyl or an isopropyl. In the case where one of the two carbon atoms of the benzene nucleus of $R^B$ ortho to the magnesium is substituted with an isopropyl, the second carbon atom of the benzene nucleus of $R^B$ ortho to the magnesium is preferably not substituted with an isopropyl. Preferably, the carbon atoms of the benzene nucleus of $R^B$ ortho to the magnesium are substituted with a methyl or an ethyl. More preferentially, the carbon atoms of the benzene nucleus of $R^B$ ortho to the magnesium are substituted with a methyl.

According to any one of the embodiments of the invention, the group represented by the symbol $R^B$ is other than a mesityl group when $R^A$ is n-butyl.

According to a preferential embodiment, the asymmetric diorganomagnesium compound corresponds to formula (II) in which $R^A$ is an alkyl, a cycloalkyl or a benzyl, which may be substituted or unsubstituted, $R_1$ and $R_5$, which may be identical or different, represent a methyl or an ethyl and $R_2$, $R_3$ and $R_4$, which may be identical or different, represent a hydrogen atom or an alkyl, it being understood that $R^B$ is other than a mesityl group when $R^A$ is n-butyl. Preferably, $R_1$ and $R_5$ represent a methyl. Preferably, $R_2$ and $R_4$ represent a hydrogen atom.

(II)

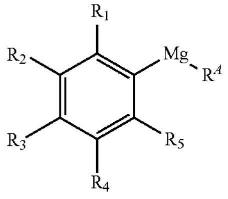

According to a preferential variant, $R_1$, $R_3$ and $R_5$ are identical. According to a more preferential variant, $R_2$ and $R_4$ represent a hydrogen and $R_1$, $R_3$ and $R_5$ are identical. In a more preferential variant, $R_2$ and $R_4$ represent a hydrogen and $R_1$, $R_3$ and $R_5$ represent a methyl.

The asymmetric diorganomagnesium compound that is in accordance with the invention may be prepared via a process, which is another subject of the invention, which comprises the following steps:

- the placing in contact of an organometallic compound of formula $R^AM$ with an organomagnesium agent of formula $R^B$—Mg—X,
- the reaction of the organometallic compound of formula $R^AM$ and of the organomagnesium agent of formula $R^B$—Mg—X,
- M representing a lithium, sodium or potassium atom, X representing a leaving group, $R^B$ and $R^A$ being as defined previously.

The term "leaving group" means a leaving group as defined by the IUPAC. Leaving groups that may be mentioned most particularly include halogen atoms chosen from the group consisting of chlorine, fluorine, bromine and iodine. X is preferentially a halogen atom. X is more preferentially a bromine atom or a chlorine atom. X is even more preferentially a bromine atom.

Preferably, M represents a lithium atom, in which case the organometallic compound of formula $R^AM$ is an organolithium agent.

The reaction of the organolithium agent and of the organomagnesium agent is typically performed in an ether such as diethyl ether, dibutyl ether, tetrahydrofuran or methyltetrahydrofuran. The reaction is also typically performed at a temperature ranging from 0° C. to 60° C. The placing in contact is preferably performed at a temperature of between 0° C. and 23° C.

The placing in contact of the organometallic compound of formula $R^AM$ with the organomagnesium agent of formula $R^B$—Mg—X is preferentially performed by adding a solution of the organometallic compound $R^AM$ to a solution of the organomagnesium agent $R^B$—Mg—X. The solution of the organometallic compound $R^AM$ is generally a solution in a hydrocarbon solvent, preferably n-hexane, cyclohexane or methylcyclohexane, and the solution of the organomagnesium agent $R^B$—Mg—X is generally a solution in an ether, preferably diethyl ether or dibutyl ether. Preferably, the respective concentrations of the solutions of the organometallic compound and of the organomagnesium agent $R^AM$ and $R^B$—Mg—X are 0.01 to 1 mol/l and from 1 to 5 mol/l. More preferentially, the respective concentrations of the solutions of the organometallic compound and of the organomagnesium agent $R^AM$ and $R^B$—Mg—X are from 0.05 to 0.2 mol/l and from 2 to 3 mol/l.

Like any synthesis performed in the presence of organometallic compounds, the placing in contact and the reaction take place under anhydrous conditions under an inert atmosphere. Typically, the solvents and the solutions are used under anhydrous nitrogen or argon. The various steps of the process are generally performed with stirring.

Once the asymmetric diorganomagnesium compound has been formed, it is generally recovered in solution after filtration performed under an inert anhydrous atmosphere. The solution of asymmetric diorganomagnesium compound is typically stored before use in hermetic vessels, for example capped bottles, at a temperature of between −25° C. and 23° C.

Like any organomagnesium compound, the diorganomagnesium compound $R^B$—Mg—$R^A$ that is in accordance with the invention may be in the form of a monomer species $(R^B—Mg—R^A)_1$ or in the form of a polymer species $(R^B—Mg—R^A)_p$, p being an integer greater than 1, notably a dimer $(R^B—Mg—R^A)_2$. Moreover, whether it is in the form of a monomer or polymer species, it may also be in the form of a species coordinated to one or more molecules of a solvent, preferably of an ether such as diethyl ether, tetrahydrofuran or methyltetrahydrofuran.

The asymmetric diorganomagnesium compound in accordance with the invention is most particularly intended to be used as co-catalyst in a catalytic system comprising an organometallic complex and useful for the polymerization or copolymerization of olefins or of dienes. The organometallic complex is typically a rare-earth metal metallocene or hemimetallocene. The asymmetric diorganomagnesium compound serves to activate the organometallic complex with respect to the polymerization reaction, notably in the polymerization initiation reaction. It can replace the co-catalyst of the catalytic systems described, for example, in EP 1092731 A1, WO 2004035639 A1, WO 2005028526 A1, WO2007045223 A2 and WO2007045224 A2. It can also replace the co-catalyst of the catalytic systems "preformed"

in the presence of a monomer and described, for example, in WO 2017093654 A1, WO 2018020122 A1 and WO 2018100279 A1.

When used as co-catalyst in the catalytic system, the asymmetric diorganomagnesium compound makes it possible to increase the catalytic activity of the catalytic system in the synthesis of polymers and also to increase the yield of the reaction for the functionalization of these polymers. The polymers are typically copolymers of dienes and of olefins. Olefins that may particularly be mentioned include ethylene and α-olefins, notably those containing 3 to 18 carbon atoms. Dienes that are most particularly suitable for use are 1,3-dienes, more particularly 1,3-dienes containing from 4 to 24 carbon atoms, such as 1,3-butadiene, isoprene, myrcene, 3-farnesene, and mixtures thereof.

In summary, the invention is advantageously performed according to any one of the following embodiments 1 to 17:

Embodiment 1: Asymmetric diorganomagnesium compound of formula (I)

$$R^B\text{—Mg-}R^A \quad (I)$$

- $R^B$ being different from $R^A$,
- $R^B$ comprising a benzene nucleus substituted with a magnesium atom, one of the carbon atoms of the benzene nucleus ortho to the magnesium being substituted with a methyl, an ethyl, an isopropyl or forming a ring with the carbon atom which is its closest neighbour and which is meta to the magnesium, the other carbon atom of the benzene nucleus ortho to the magnesium being substituted with a methyl, an ethyl or an isopropyl,
- $R^A$ being an alkyl, a cycloalkyl or a benzyl, which may be substituted or unsubstituted,
- which diorganomagnesium compound is other than n-butylmesitylmagnesium.

Embodiment 2: Asymmetric diorganomagnesium compound according to embodiment 1, in which, if one of the two carbon atoms of the benzene nucleus of $R^B$ ortho to the magnesium is substituted with an isopropyl, the second carbon atom of the benzene nucleus of $R^B$ ortho to the magnesium is not substituted with an isopropyl.

Embodiment 3: Asymmetric diorganomagnesium compound according to embodiment 1 or 2, in which the carbon atoms of the benzene nucleus of $R^B$ ortho to the magnesium are substituted with a methyl or an ethyl, preferably a methyl.

Embodiment 4: Asymmetric diorganomagnesium compound according to any one of embodiments 1 to 3, in which the diorganomagnesium compound is of formula (II)

(II)

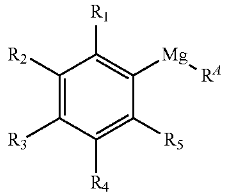

in which

- $R_1$ and $R_5$ represent a methyl or an ethyl, preferably a methyl,
- $R_2$, $R_3$ and $R_4$, which may be identical or different, represent a hydrogen atom or an alkyl,
- $R^A$ is an alkyl, a cycloalkyl or a benzyl, which may be substituted or unsubstituted.

Embodiment 5: Asymmetric diorganomagnesium compound according to embodiment 4, in which $R_1$, $R_3$ and $R_5$ are identical.

Embodiment 6: Asymmetric diorganomagnesium compound according to embodiment 4 or 5, in which $R_1$, $R_3$ and $R_5$ are methyl.

Embodiment 7: Asymmetric diorganomagnesium compound according to any one of embodiments 4 to 6, in which $R_2$ and $R_4$ represent a hydrogen atom.

Embodiment 8: Asymmetric diorganomagnesium compound according to any one of embodiments 1 to 7, in which $R^A$ represents an alkyl containing from 1 to 12 carbon atoms.

Embodiment 9: Asymmetric diorganomagnesium compound according to any one of embodiments 1 to 8, in which $R^A$ represents an alkyl containing from 2 to 10 carbon atoms.

Embodiment 10: Asymmetric diorganomagnesium compound according to any one of embodiments 1 to 9, in which $R^A$ represents an alkyl containing from 2 to 8 carbon atoms.

Embodiment 11: Asymmetric diorganomagnesium compound according to any one of embodiments 1 to 10, in which $R^A$ represents a linear alkyl.

Embodiment 12: Asymmetric diorganomagnesium compound according to any one of embodiments 1 to 11, in which $R^A$ represents n-butyl.

Embodiment 13: Process for preparing an asymmetric diorganomagnesium compound of formula $R^B$—Mg—$R^A$, which comprises the placing in contact of an organometallic compound of formula $R^AM$ with an organomagnesium agent of formula $R^B$—Mg—X and the reaction of the organometallic compound of formula $R^AM$ and of the organomagnesium agent of formula $R^B$—Mg—X,

- M representing a lithium, sodium or potassium atom,
- X representing a leaving group,
- $R^B$ and $R^A$ being as defined according to any one of embodiments 1 to 12,
- said diorganomagnesium compound being other than n-butylmesitylmagnesium.

Embodiment 14: Process according to embodiment 13, in which X is a halogen atom.

Embodiment 15: Process according to either one of embodiments 13 and 14, in which X is a bromine atom or a chlorine atom.

Embodiment 16: Process according to any one of embodiments 13 to 15, in which X is a bromine atom.

Embodiment 17: Process according to any one of embodiments 13 to 16, in which M represents a lithium atom.

The abovementioned characteristics of the present invention, and also others, will be understood more clearly on reading the following description of several implementation examples of the invention, which are given as non-limiting illustrations.

EXAMPLES

Starting Materials:

Phenylmagnesium bromide dissolved in diethyl ether at 3 mol/L, mesitylmagnesium bromide dissolved in diethyl ether at 1 mol/L, and triisopropylphenylmagnesium bromide dissolved in tetrahydrofuran at 0.5 mol/L are obtained from Sigma-Aldrich and used without prior purification.

Synthesis of the Diorganomagnesium Compounds:

Characterization of the Diorganomagnesium Compounds Synthesized:

The structure of the diorganomagnesium compounds is characterized by 1D $^1H$, $^1H$-$^{13}C$ HSQC ((Heteronuclear Single Quantum Coherence), $^1$H-$^{13}$C HMBC (Heteronuclear Multiple-Bond Correlation) nuclear magnetic resonance NMR. The diorganomagnesium compound is analysed with its synthesis solvent and $d_4$-THF is added to the solution to obtain the NMR "lock".

Procedure for the Syntheses of the Diorganomagnesium Compounds:

Synthesis of Butylphenylmagnesium (PhMgBu): Example not in Accordance with the Invention 1.2 mL of phenyl-Mg—Br at 3 mol/L in diethyl ether are introduced into a pre-sparged Steinie bottle. 57 mL of n-BuLi at 0.06 mol/L in methylcyclohexane (MCH) are then added at 23° C. A white precipitate forms and the bottle is left stirring overnight at 23° C. on a device which shakes the bottle, known as a shaker. The precipitate is filtered off on a 0.45 m filter during the transfer of the liquid phase to another pre-sparged Steinie bottle. The formation and structure of the asymmetric diorganomagnesium compound are confirmed by the NMR analyses, notably by a chemical shift signal of from 6.6 ppm to 6.55 ppm (aromatic protons of the phenyl) and a chemical shift signal of from −1 ppm to −0.45 ppm (butyl protons).

Synthesis of Butylmesitylmagnesium (MesMgBu): Example in Accordance with the Invention 3.6 mL of mesityl-Mg—Br at 1 mol/L in diethyl ether are introduced into a pre-sparged Steinie bottle. 57 mL of n-BuLi at 0.06 mol/L in MCH are then added at 23° C. A white precipitate forms and the bottle is left stirring overnight at 23° C. on a shaker. The precipitate is filtered off on a 0.45 μm filter during the transfer of the liquid phase to another pre-sparged Steinie bottle. The formation and structure of the asymmetric diorganomagnesium compound are confirmed by the NMR analyses, notably by a chemical shift signal at 6.5 ppm (benzene nucleus proton meta to the magnesium) and a chemical shift signal at −0.5 ppm (protons alpha to the Mg on the n-butyl chain).

Synthesis of Butyltriisopropylphenylmagnesium ($(iPr)_3$PhMgBu): Example not in Accordance with the Invention 3 mL of triisopropylphenyl-Mg—Br at 0.5 mol/L in tetrahydrofuran (THF) are introduced into a pre-sparged Steinie bottle. 25 mL of n-BuLi at 0.06 mol/L in MCH are then added. A slight white precipitate forms and the bottle is left overnight at room temperature on a shaker.

The compound is used directly in polymerization.

Copolymerization of Ethylene and of 1,3-Butadiene:

The metallocene $[\{Me_2SiFlu_2Nd(\mu\text{-}BH_4)_2Li(THF)\}]_2$ is prepared according to the procedure described in patent application WO 2007/054224.

The butyloctylmagnesium BOMAG (20% in heptane, at 0.88 $mol{\cdot}l^{4}$) is obtained from Chemtura and is stored in a Schlenk tube under an inert atmosphere.

The ethylene, of N35 grade, is obtained from the company Air Liquide and is used without prior purification.

The 1,3-butadiene is purified over alumina guards.

The (N,N-dimethyl-3-aminopropyl)methyldimethoxysilane is obtained from ABCR and is used without prior purification.

The methylcyclohexane (MCH) solvent obtained from BioSolve is dried and purified on an alumina column in a solvent purifier obtained from mBraun and used under an inert atmosphere.

All the reactions are performed under an inert atmosphere.

The catalytic systems are prepared according to the process disclosed in patent application WO 2007/054224 and described below:

All the polymerizations and the functionalization reactions of copolymers of ethylene and of 1,3-butadiene are performed in a reactor having a disposable 500 ml glass tank (Schott flasks) equipped with a stainless-steel stirring blade. The control of the temperature is ensured by means of a thermostatically-controlled oil bath connected to a polycarbonate jacket. This reactor has all the inlets or outlets necessary for the handling operations.

The co-catalyst and then the metallocene are added to a 500-ml glass reactor containing MCH. The amount of co-catalyst introduced is 40 mg, and the ratio between the number of moles of Mg of the co-catalyst and the number of moles of Nd of the metallocene is 4.5. The activation time is 10 minutes and the reaction temperature is 80° C.

The polymerization is performed at 80° C. and at an initial pressure of 4 bar absolute in the 500 mL glass reactor containing 300 mL of polymerization solvent, methylcyclohexane, and the catalytic system. The 1,3-butadiene and ethylene are introduced in the form of a gaseous mixture containing 20 mol % of 1,3-butadiene. The polymerization reaction is stopped by cooling, degassing the reactor and adding methanol. The copolymer is recovered and then dried. The weighed mass makes it possible to determine the mean catalytic activity of the catalytic system, expressed in kilograms of copolymer synthesized per mole of neodymium metal and per hour (kg/mol·h).

Unless otherwise indicated, the polymerization is stopped by degassing the reactor and adding the functionalizing agent at 80° C. after formation of 12 to 13 g of polymer. The co-catalysts used are butyloctylmagnesium (BOMAG), phenyl-Mg-butyl, mesityl-Mg-butyl and triisopropylphenyl-Mg-butyl. For each of the co-catalysts, the catalytic activity of the catalytic system is determined. The results are given in Table 1. The polymers synthesized are characterized by proton and carbon-13 NMR and by size exclusion chromatography (SEC). The results are given in Table 2 (microstructure) and Table 3 (macrostructure).

Functionalization Procedure:

When the desired monomer conversion is achieved, the content of the reactor is degassed and two equivalents (relative to the magnesium) of the functionalizing agent, (N,N-dimethyl-3-aminopropyl)methyldimethoxysilane, are then introduced under an inert atmosphere by positive pressure. The reaction medium is stirred for 60 minutes at 80° C. After reaction, the medium is degassed and then precipitated from methanol. The polymers are redissolved in toluene and then precipitated from methanol so as to remove the ungrafted "silane" molecules, which makes it possible to improve the quality of the signals of the spectra for the quantification of the functional group content and the integration of the various signals. The polymer is antioxidized and then dried at 60° C. under vacuum to constant mass. It is then analysed by SEC (THF), and $^1$H, $^{13}$C and $^{29}$Si NMR. The results are given in Table 4.

Nuclear Magnetic Resonance (NMR):

All the products for functionalization of the copolymers of ethylene and of 1,3-butadiene are characterized by 1H, $^{13}$C and $^{29}$Si NMR spectrometry. The NMR spectra are acquired on a Bruker Avance III 500 MHz spectrometer equipped with a 5 mm BBIz-grad "broad band" cryoprobe. The quantitative 1H NMR experiment uses a 300 single pulse sequence and a repetition time of 5 seconds between each acquisition. 64 to 256 accumulations are performed. The quantitative $^{13}$C NMR experiment uses a 300 single pulse sequence with proton decoupling and a repetition time of 10 seconds between each acquisition. 1024 to 10 240 accumulations are performed. $^1$H/$^{13}$C and $^1$H/$^{29}$Si two-dimensional experiments are used for the purpose of determining the structure of the functional polymers. The determination of the microstructure of the copolymers is defined in the literature, according to the article by Llauro et al., Macromolecules 2001, 34, 6304-6311.

The final chemical structure of each functional polymer is identified by NMR ($^{1}H$, $^{13}C$ and $^{29}Si$).

Size Exclusion Chromatography (SEC):

a) For the copolymers which are soluble at room temperature in tetrahydrofuran (THF), the molar masses were determined by size exclusion chromatography in THF. The samples were injected using a Waters 717 injector and a Waters 515 HPLC pump at a flow rate of 1 ml·min$^{-1}$ in a series of Polymer Laboratories columns.

This series of columns, placed in a chamber thermostatically maintained at 45° C., is composed of:

1 PL Gel 5 µm precolumn,

2 PL Gel 5 µm Mixed C columns,

1 PL Gel 5 µm-500 Å column.

The detection was performed using a Waters 410 refractometer.

The molar masses were determined by universal calibration using polystyrene standards certified by Polymer Laboratories and a double detection with a refractometer and coupling to the viscometer.

Without being an absolute method, SEC makes it possible to comprehend the molecular mass distribution of a polymer. On the basis of standard commercial products of polystyrene type, the various number-average (Mn) and weight-average (Mw) masses can be determined and the polydispersity index can be calculated (PDI=Mw/Mn).

b) For the copolymers which are insoluble in tetrahydrofuran at room temperature, the molar masses were determined in 1,2,4-trichlorobenzene. They were first dissolved under hot conditions (4 hours at 150° C.) and were then injected at 150° C., at a flow rate of 1 ml·min-1, into a Waters Alliance GPCV 2000 chromatograph equipped with three Styragel columns (two HT6E columns and one HT2 column).

The detection was performed using a Waters refractometer.

The molar masses were determined by relative calibration using polystyrene standards certified by Polymer Laboratories.

TABLE 1

| Example | Co-catalyst | Activity (kg/mol · h) |
|---|---|---|
| 1 | BOMAG | 125 |
| 2 | PhMgBu | 71 |
| 3 | MesMgBu | 143 |
| 4 | (iPr)3PhMgBu | 32 |

TABLE 2

| Co-catalyst | % Eth in EBR (1) | % PB1,2/EBR (2) | % PB1,4/EBR (3) | % cycles/ EBR (4) |
|---|---|---|---|---|
| BOMAG | 80 | 4 | 4-5 | 11-12 |
| PhMgBu | 79 | 5 | 4 | 11 |
| MesMgBu | 76-78 | 5-6 | 5 | 11-13 |
| (iPr)3PhMgBu | 77 | 6 | 5 | 11 |

(1) molar content of (CH2—CH2) units in the copolymer
(2) molar content of (CH2—C(CH═CH2)) units in the copolymer
(3) molar content of (CH2—CH═CH—CH2) units in the copolymer
(4) molar content of 1,2-cyclohexanediyl units in the copolymer

TABLE 3

| Co-catalyst | nMg (µmol) (1) | mpolymer (g) (2) | Ip (3) |
|---|---|---|---|
| BOMAG | 278 | 11.5 | 1.40 |
| PhMgBu | 282 | 13.4 | 1.41 |
| MesMgBu | 275 | 13.1 | 1.3 |
| (iPr)3PhMgBu | 293 | 2.2 | 1.51 |

(1) number of moles of magnesium introduced into the reactor
(2) mass of copolymer formed
(3) polydispersity index of the copolymer

TABLE 4

| Co-catalyst | Functional group content |
|---|---|
| BOMAG | 45% |
| PhMgBu | 46% |
| MesMgBu | 57% |
| (iPr)3PhMgBu | 60% |

The results given in Table 4 show that the catalytic systems according to the invention (Examples 3 and 4), which differ from those of the prior art by the presence in the co-catalyst of a disubstituted benzene nucleus ortho to the magnesium, make it possible to improve the content of functional polymer chains in the reaction for the functionalization of the copolymer of ethylene and of 1,3-diene. An 11% gain in the functionalization reaction yield is obtained. These results are obtained even though the microstructure and the macrostructure (PDI) of the polymers synthesized in Examples 1 to 4 are virtually identical (Tables 2 and 3).

An improvement in the process for synthesizing the polymers may also be observed, when the substituents on the benzene nucleus ortho to the magnesium in the asymmetric diorganomagnesium compound are both other than an isopropyl group (Table 1). Specifically, the catalytic activity in Example 3 is the highest: a gain of at least 10% is obtained relative to the other examples.

In summary, the combined use of the metallocene and of the asymmetric diorganomagnesium compound as described according to the embodiments of the invention makes it possible to increase the content of functional polymer chains. Even the catalytic activity in the synthesis of polymers may also be improved when the substituents on the benzene nucleus ortho to the magnesium in the asymmetric diorganomagnesium compound are both other than an isopropyl group.

The invention claimed is:

1. An asymmetric diorganomagnesium compound of formula (I)

$$R^{B}—Mg—R^{A} \quad (I),$$

$R^{B}$ being different from $R^{A}$, $R^{B}$ comprising a benzene ring substituted with the magnesium atom, one of the carbon atoms of the benzene ring ortho to the magnesium atom being substituted with a methyl, an ethyl, an isopropyl or forming a ring with the carbon atom which is its closest neighbor and which is meta to the magnesium atom, the other carbon atom of the benzene ring ortho to the magnesium atom being substituted with a methyl, an ethyl or an isopropyl, $R^{A}$ being an alkyl, a cycloalkyl or a benzyl, which may be substituted or unsubstituted, wherein the diorganomagnesium compound is other than n-butylmesitylmagnesium.

2. The asymmetric diorganomagnesium compound according to claim 1, in which $R^A$ represents an alkyl containing from 2 to 10 carbon atoms.

3. The asymmetric diorganomagnesium compound according to claim 1, in which $R^A$ represents a linear alkyl.

4. A process for preparing an asymmetric diorganomagnesium compound of formula $R^B$—Mg—$R^A$, which comprises the placing in contact of an organometallic compound of formula $R^AM$ with an organomagnesium agent of formula $R^B$—Mg—X and the reaction of the organometallic compound of formula $R^AM$ and of the organomagnesium agent of formula $R^B$—Mg—X, M representing a lithium, sodium or potassium atom, X representing a leaving group, $R^B$ being different from $R^A$, $R^B$ comprising a benzene ring substituted with the magnesium atom, one of the carbon atoms of the benzene ring ortho to the magnesium atom being substituted with a methyl, an ethyl, an isopropyl or forming a ring with the carbon atom which is its closest neighbor and which is meta to the magnesium atom, the other carbon atom of the benzene ring ortho to the magnesium atom being substituted with a methyl, an ethyl or an isopropyl, $R^A$ being an alkyl, a cycloalkyl or a benzyl, which may be substituted or unsubstituted, said diorganomagnesium compound being other than n-butylmesitylmagnesium.

5. The process according to claim 4, in which X is a halogen atom.

6. The process according to claim 4, in which X is a bromine atom or a chlorine atom.

7. The process according to claim 4, in which M represents a lithium atom.

8. The asymmetric diorganomagnesium compound according to claim 1, in which the carbon atoms of the benzene ring of $R^B$ ortho to the magnesium atom are substituted with a methyl.

9. The asymmetric diorganomagnesium compound according to claim 2, in which $R^A$ represents an alkyl containing from 2 to 8 carbon atoms.

10. The process according to claim 6, in which X is a bromine atom.

11. The process according to claim 4, in which, if one of the two carbon atoms of the benzene ring of $R^B$ ortho to the magnesium atom is substituted with an isopropyl, the second carbon atom of the benzene ring of $R^B$ ortho to the magnesium atom is not substituted with an isopropyl.

12. The process according to claim 4, in which the carbon atoms of the benzene ring of $R^B$ ortho to the magnesium atom are substituted with a methyl or an ethyl.

13. A process for preparing an asymmetric diorganomagnesium compound of formula (II)

(II)

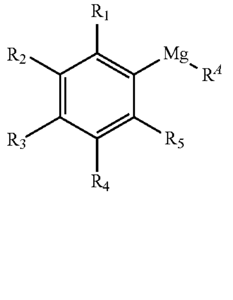

in which $R_1$ and $R_5$ represent a methyl or an ethyl, $R_2$, $R_3$ and $R_4$, which may be identical or different, represent a hydrogen atom or an alkyl, $R^A$ is an alkyl, a cycloalkyl or a benzyl, which may be substituted or unsubstituted, which comprises the placing in contact of an organometallic compound of formula $R^AM$ with an organomagnesium agent of formula $R^B$—Mg—X and the reaction of the organometallic compound of formula $R^AM$ and of the organomagnesium agent of formula $R^B$—Mg—X, the organomagnesium agent of formula $R^B$—Mg—X being of the formula:

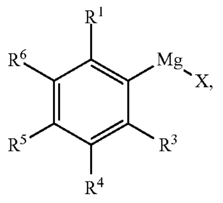

M representing a lithium, sodium or potassium atom, and

X representing a leaving group, said diorganomagnesium compound of formula (II) being other than n-butylmesitylmagnesium.

14. An asymmetric diorganomagnesium compound of formula (II)

(II)

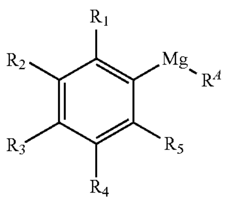

in which $R_1$ and $R_5$ represent a methyl or an ethyl, $R_2$, $R_3$ and $R_4$, which may be identical or different, represent a hydrogen atom or an alkyl, $R^A$ is an alkyl, a cycloalkyl or a benzyl, which may be substituted or unsubstituted said diorganomagnesium compound of formula (II) being other than n-butylmesitylmagnesium.

15. The asymmetric diorganomagnesium compound according to claim 14, in which $R_1$, $R_3$ and $R_5$ are identical.

16. The asymmetric diorganomagnesium compound according to claim 14, in which $R_2$ and $R_4$ represent a hydrogen atom.

17. The asymmetric diorganomagnesium compound according to claim 14, in which $R^A$ represents an alkyl containing from 2 to 10 carbon atoms.

18. The asymmetric diorganomagnesium compound according to claim 17, in which $R^A$ represents an alkyl containing from 2 to 8 carbon atoms.

19. The asymmetric diorganomagnesium compound according to claim 14, in which $R^A$ represents a linear alkyl.

20. The asymmetric diorganomagnesium compound according to claim 14, in which $R_1$ and $R_5$ represent a methyl.

* * * * *